United States Patent [19]

Gordon

[11] Patent Number: 5,772,160
[45] Date of Patent: Jun. 30, 1998

[54] SUPPORT BRACKET FOR RELEASABLE MOUNTING TO SPACED TUBES

[75] Inventor: Gary G. Gordon, Southfield, Mich.

[73] Assignee: TRW Inc., Cleveland, Ohio

[21] Appl. No.: 716,097

[22] Filed: Sep. 19, 1996

[51] Int. Cl.$^6$ ...................................................... F16L 3/00
[52] U.S. Cl. ...................... 248/68.1; 248/74.1; 248/74.2; 248/316.1
[58] Field of Search .......................... 248/68.1, 72, 74.1, 248/72.2, 316.1, 316.7

[56] References Cited

U.S. PATENT DOCUMENTS

| | | | |
|---|---|---|---|
| 1,334,545 | 3/1920 | Londelius, Jr. ........................ | 248/68.1 |
| 2,543,997 | 3/1951 | Vavra et al. ............................ | 248/68.1 |
| 3,017,034 | 1/1962 | Klein . | |
| 3,917,202 | 11/1975 | Reibwall, Jr. et al. ................ | 248/68.1 |
| 4,467,988 | 8/1984 | Kraus ..................................... | 248/74.1 |
| 4,850,282 | 7/1989 | Postic . | |
| 4,865,279 | 9/1989 | Kosugi ................................... | 248/68.1 |
| 4,998,700 | 3/1991 | McKaig . | |
| 5,067,677 | 11/1991 | Miceli ................................... | 248/74.2 |
| 5,178,353 | 1/1993 | Huxtable . | |
| 5,263,671 | 11/1993 | Baum .................................... | 248/68.1 |
| 5,351,920 | 10/1994 | Decky et al. . | |
| 5,398,157 | 3/1995 | Paul . | |
| 5,601,260 | 2/1997 | Shinohara et al. .................... | 248/68.1 |

*Primary Examiner*—Victor N. Sakran
*Attorney, Agent, or Firm*—Fay, Sharpe, Beall, Fagan, Minnich & McKee

[57] ABSTRACT

A bracket for mounting from a pair of pipes that extend in spaced parallel relationship comprises a main bracket body having oppositely disposed front and rear faces. A plurality of resilient retaining clips extend from the rear face. The clips are configured and adapted to partially encircle the pipes in gripping relationship thereto. At least one of the retaining clips includes a pivotal latch associated therewith and adapted for releasably latching the clip to the associated pipe and preventing undesired disengagement therefrom.

17 Claims, 2 Drawing Sheets

5,772,160

SUPPORT BRACKET FOR RELEASABLE MOUNTING TO SPACED TUBES

BACKGROUND OF THE INVENTION

The subject invention is directed toward the art of brackets and supports and, more particularly, to a bracket assembly for releasable mounting to a pair of spaced tubes or pipes.

The invention is especially suited for use in combination with a vehicle power steering unit for mounting associated electrical or speed control modules to hydraulic and pressure piping of the power steering unit. The invention is, of course, capable of broader application and could be used as a support or mounting bracket in a variety of environments.

In the vehicle industry, it is sometimes necessary to support various control modules and the like from associated structures. It is highly desirable that the supports or brackets used be capable of being quickly installed and removed without the use of tools, special fasteners, or complicated connectors. In addition, it is mandatory that the support or brackets remain in the attached position until removal is desired for maintenance or repair. A tendency to loosen or disconnect because of vibration is unacceptable.

SUMMARY OF THE INVENTION

The subject invention provides a bracket or support assembly that satisfies the above criteria in an extremely efficient and effective manner. Support brackets formed in accordance with the invention can be mounted in any of a variety of different positions for carrying or supporting many different structures. In particular, and in accordance with one aspect of the invention, there is provided a mounting bracket for connecting to and being supported from a pair of pipes that extend in spaced, parallel relationship. The assembly comprises a main bracket body having oppositely disposed front and rear faces. A plurality of resilient retaining clips extend from the rear face. The clips are each configured and adapted to resiliently and partially encircle one of the pipes in gripping relationship thereto. At least one of the retaining clips includes a pivotal latch means associated therewith and adapted for releasably latching at least one clip to the associated pipe and preventing undesired disengagement therefrom.

Preferably, and in accordance with a more limited aspect of the invention, the assembly is a one-piece plastic molding and the mounting clips have a laterally facing, pipe-receiving opening adjacent the rear face of the main body to permit the clips to be joined to the pipes by moving the bracket in a direction generally parallel to the rear face.

In addition, and in accordance with a further aspect of the invention, the pivotal latch means preferably includes an arm joined to the main body by a living hinge and extending therefrom to a terminal end. Catch elements are provided for selectively joining the terminal end of the arm to one of the retaining clips.

Preferably, all of the pipe-receiving openings of the retaining clips face in the same direction. Also, it is preferable to have the latch means arranged so that when it is in the latched position, it closes the pipe-receiving opening on the resilient clip with which it is associated.

In its preferred form, the assembly includes pipe-engaging leg portions in spaced alignment with the clip to provide additional stability to the assembly.

As can be seen from the foregoing, a primary object of the invention is the provision of a support bracket that is both simple in design and easy to use.

A further object of the invention is the provision of a support bracket of the type described which can be formed as a single-piece plastic molding and which can be installed without the use of tools or mechanical fasteners.

A still further object of the invention is the provision of a bracket of the type described wherein mounting can take place by simple sliding movement and which can be manually locked in the mounted position.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
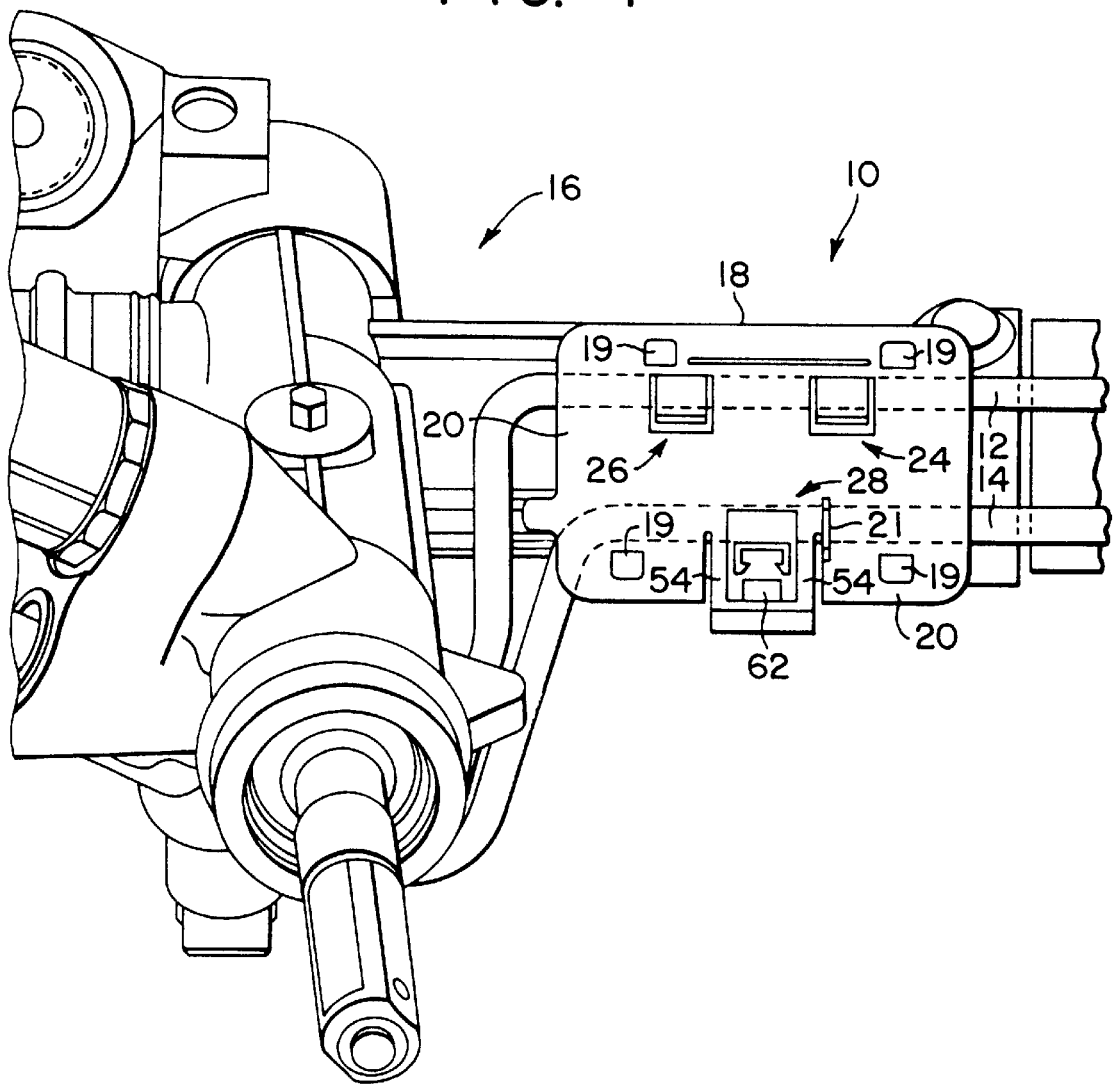
FIG. 1 is an isometric view showing a bracket formed in accordance with the invention mounted from a pair of spaced, parallel, hydraulic pipes or tubes of a motor vehicle power steering unit.

Referring now to the drawings wherein the showings are for the purposes of illustrating the preferred embodiment of the invention only and not for purposes of limiting same, FIG. 1 shows a mounting bracket 10 connected to and supported by a pair of parallel tubes or pipes 12 and 14 that form part of a power steering actuating unit 16. The bracket 10 is intended for supporting an electrical speed control module. As can be appreciated, the support or mounting bracket 10 could have a variety of different shapes or sizes but is shown as comprising a generally rectangular main body 18 having opposed, generally planar front and rear faces 20 and 22, respectively. Preferably, the bracket is molded of a suitable, relatively rigid plastic material as a one-piece unitary assembly. In addition, the body can include provisions for attaching the associated devices to be supported on the body. For example, openings 19 and ribs or webs 21, as well as integral fasteners, could be provided.

Figure 2:
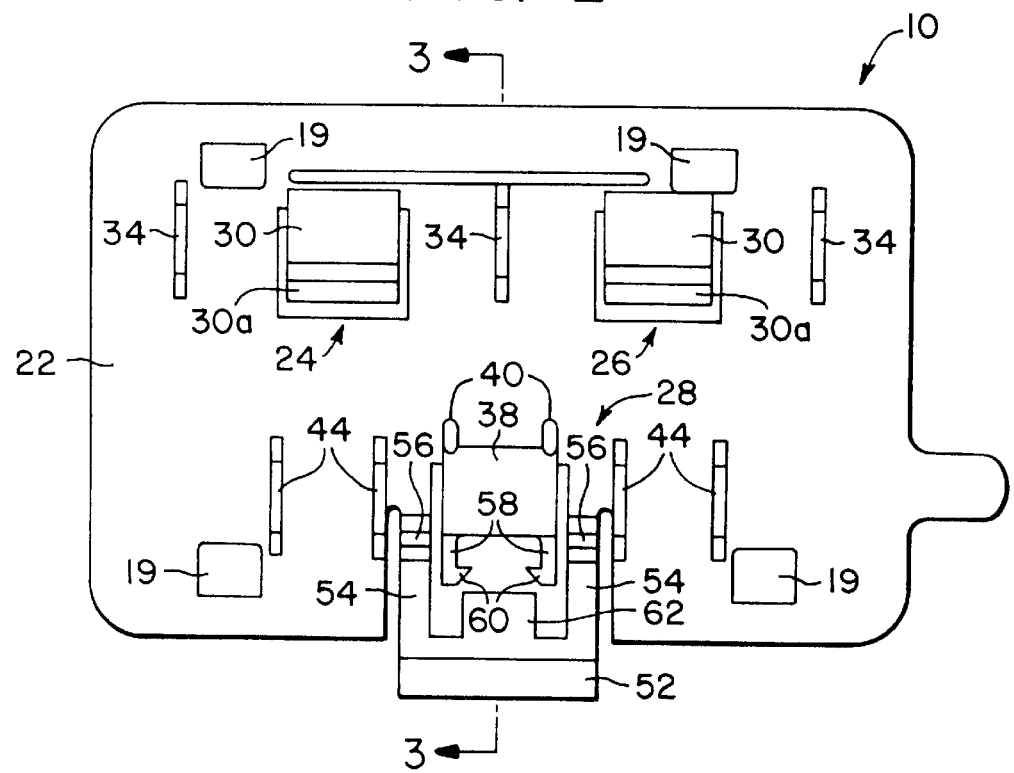
FIG. 2 is a rear elevational view of the bracket of FIG. 1 (the bracket is shown in the disconnected condition)
Figure 3:
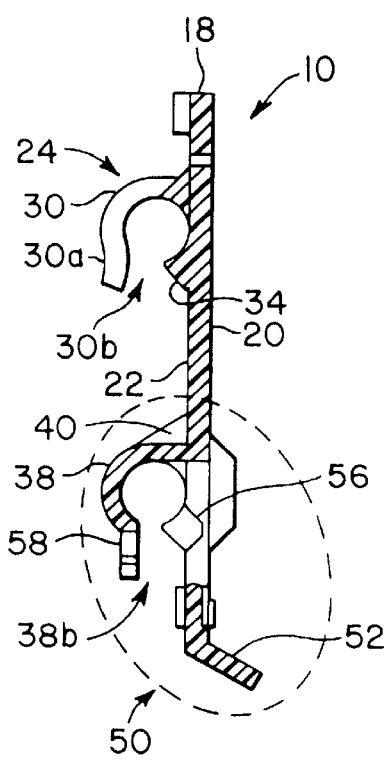
FIG. 3 is a cross-sectional view taken on line 3—3 of FIG. 2.

As best seen in FIGS. 2 and 3, the bracket includes a plurality of pipe encircling clips 24, 26, 28. The clips 24 and 26 are arranged to engage the first pipe or tube 12 and are positioned longitudinally spaced from one another but in transverse alignment relative to the main body 18 of the mounting bracket 10. The third resilient clip 28 is positioned longitudinally intermediate the clips 24 and 26, but transversely spaced for engagement with the second pipe or tube 14.

The clips 24 and 26 are of identical shape and configuration and generally include a resilient arm 30 best shown in FIG. 3 which hooks outwardly from the main body 18 and is molded integrally therewith. The terminal end 30a of each arm 30 flares outwardly as illustrated and defines a laterally facing, tube-receiving opening 30b. As previously mentioned, each of the clips 24 and 26 are resilient and are sized so as to closely encircle the particular pipe or tube to which the mounting bracket is to be affixed. Also associated with the clips 24 and 26 are a series of saddle-like support bases or legs 34 which, as best seen in FIG. 3, extend outwardly from the rear face 22 and provide a curved base surface to engage the tube at the side generally opposite the arms 30 of the clips 24, 26. As seen in FIG. 2, the bases 34 are equally spaced, with one located intermediate the clips 24, 26 and two located axially (relative to the engaged tube) outwardly. The combination of the clips 24, 26 and the bases 34 allow for spaced engagement and gripping of the tube 12 in a manner subsequently to be described.

The clip 28 has many features in common with the clips 24, 26. It will be noted, however, that clip 28 is located in general alignment with the longitudinal mid-plane of the main body 18. Clip 28 comprises a resilient arm portion 38 that extends upwardly from the rear face 22 of the main body 18 and is contoured so as to encircle the tube or pipe 14. The arm 38 is integrally molded with the main body 18 and defines a pipe-receiving opening 38b that opens laterally in the same direction as openings 30b of clips 24, 26. A pair of relatively narrow reinforcing webs 40 that extend between the rear face 22 and the back of arm 38. Associated with the clip 28 are four saddle-like support elements 44 that are configured identically to the previously discussed support elements 34. The four support elements 44 are positioned in transverse alignment with the clip 28 to engage with the tube 14 and cooperate with clip 28 to hold the bracket 10 in proper alignment on the pipe 14.

Figure 4:
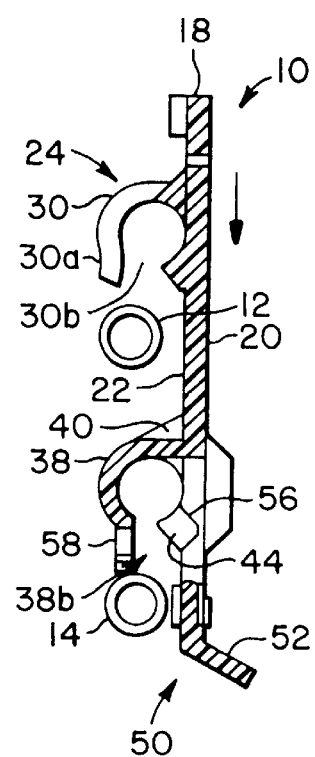
FIG. 4 is a cross-sectional view similar to FIG. 3 but showing the bracket being moved into mounted position on the hydraulic pipes or tubes; and, FIG. 5 is an enlarged view of the circled area of FIG. 3 but showing the latch in its closed and latched position.

Referring to FIG. 4, it can be seen how the support bracket 10 can be moved into position on the pipes 12 and 14 merely by positioning it in alignment with the pipes as illustrated and then sliding it in the direction of the arrow to deflect the arms 30, 38 and allow the pipes to move into the engaged position.

Figure 5:
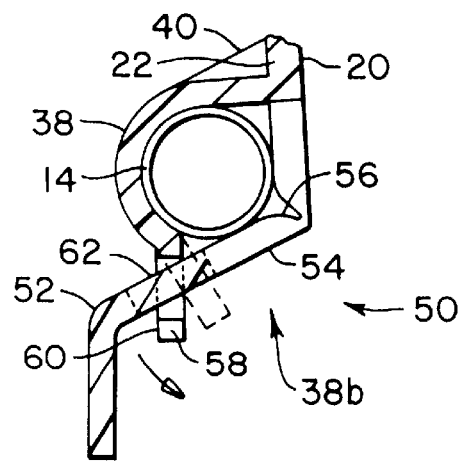

The clips 24, 26, and 28 hold the bracket 10 firmly to the tubes 12 and 14. To prevent loosening or disconnection when subjected to jarring or vibration, the bracket is provided with a pivotal latch 50 that is associated with clip 28. As will be explained, the latch 50 can be manually moved from an open or unlatched position as shown in FIGS. 1–4 to a latched position as shown in FIG. 5. To best understand the operation of latch 50 attention is directed to FIGS. 2 and 5. As shown therein, the latch 50 includes a pivotal latch arm 52 having a pair of legs 54 that join to the main body 18 on opposite sides of clip 28. A reduced thickness area 56 is located generally at the juncture between each leg 54 and the main body 18. This provides living hinges to allow the latch arm 52 to pivot between the open positions of FIGS. 1–4 and the closed position of FIG. 5.

The latch arm 52 is releasably held in the closed position by resilient catch arms 58 that extend outwardly from the free end of arm 38 of clip 28. The catch arms 58 are capable of being laterally deflected and carry catch elements 60. The location and spacing of elements 60 is selected to permit them to engage on opposite sides of a latch web 62 that extends toward the main body 18 at a location centrally between the legs 54 of latch arm 52. This allows the latch arm 52 to be pivoted to the closed position of FIG. 5. In this position, the bracket assembly cannot be moved laterally from the mounted position on the tubes 12, 14. By springing the catch arms 58 apart, the latch arm 52 can be pivoted to the open position. The bracket 10 can then be removed by sliding it laterally relative to tubes 12, 14. As can be appreciated, both installation and removal of the bracket is a simple manual operation which does not require special fasteners or tools.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In combination:
    a power steering assembly for a motor vehicle, said power steering assembly including a pair of pipes extending in spaced side-by-side parallel relationship;
    a mounting bracket carried by said pipes, said mounting bracket comprising a main body having oppositely disposed front and rear faces, resilient clips extending from the rear face of the bracket to partially encircle and resiliently grip the pipes and hold the bracket thereto, said resilient clips each having a pipe-receiving opening facing a first direction to permit the mounting bracket to be joined to the pipes by moving the bracket generally parallel to the rear face in said first direction; and,
    a pivotal latch means carried by the bracket and associated with one of the resilient clips for releasably latching to the said one of the resilient clips selectively closing the pipe-receiving opening of the said one of the resilient clips thereby preventing disengagement of the mounting bracket from the pipes in a second direction opposite to said first direction.

2. The combination as set forth in claim 1 wherein the mounting bracket is molded from a plastic material and the pivotal latch means is formed integrally therewith.

3. The combination as set forth in claim 1 wherein each of said pipe-receiving openings are disposed adjacent the rear face of the main body to permit the clips to be joined to the pipes by moving the bracket in said first direction generally parallel to the rear face.

4. The combination as set forth in claim 3 wherein the pivotal latch means includes an arm having a first end hinged to the main body and a second end that can releasably connect to said one of the resilient clips.

5. The combination as set forth in claim 4 wherein the arm is formed integrally with the main body of the bracket.

6. The combination as set forth in claim 5 wherein the arm and the main body of the bracket are molded of plastics material and the arm is hinged to the main body by a flexible web of said plastic material.

7. The combination as set forth in claim 5 wherein the resilient clips are formed integrally with the main body of the bracket.

8. The combination as set forth in claim 1 wherein a pair of resilient clips extend from the mounting bracket generally parallel to each other to simultaneously encircle and partially grip a first pipe and hold the bracket thereto.

9. The combination as set forth in claim 8 wherein a third resilient clip is positioned longitudinally intermediate the pair of resilient clips and transversely spaced to engage a second pipe.

10. The combination as set forth in claim 9 further including:
    a first set of saddle-like support bases extending outwardly from the rear face for providing a curved base surface adapted to engage a side of said first pipe generally opposite said pair of resilient clips; and,
    a second set of saddle-like support bases extending outwardly from the rear face for providing a curved base surface adapted to engage a side of said second pipe generally opposite said third resilient clip.

11. A mounting bracket for connecting to and being supported from a pair of pipes that extend in spaced parallel relationship comprising:

a main bracket body having oppositely disposed front and rear faces;

a plurality of resilient retaining clips extending from the rear face, said clips each having a pipe receiving opening facing a first direction adapted to partially encircle one of said pipes in gripping relationship thereto as the main bracket body is moved in said first direction; and, at least one of said retaining clips including a pivotal latch means associated therewith and adapted for releasably latching the said at least one clip to the associated pipe and preventing undesired disengagement therefrom in a second direction opposite to said first direction.

12. The mounting bracket as set forth in claim 11 wherein said retaining clips each have a pipe-receiving opening adjacent the rear face of the main body to permit the clips to be joined to the pipes by moving the bracket in a direction generally parallel to the rear face.

13. The mounting bracket as set forth in claim 12 wherein said pivotal latch means includes an arm joined to the main body, said arm extending therefrom to a terminal end.

14. The mounting bracket as set forth in claim 13 wherein catch elements are provided for selectively joining the terminal end of the arm to one of the retaining clips.

15. A method for releasably mounting a support bracket to spaced tubes, the method comprising:

moving a mounting bracket, including a main body with oppositely disposed front and rear faces, and resilient clips extending from the rear face of the bracket, in a first direction generally parallel to the rear face;

engaging spaced apart tubes with pipe-receiving openings of said resilient clips by moving the mounting bracket in said first direction; and, releasably latching a pivotal latch means associated with one of said resilient clips to one of the resilient clips selectively closing the pipe-receiving opening of the resilient clip thereby preventing relative movement between the mounting bracket and the spaced-apart tubes in a second direction opposite said first direction.

16. The method for releasably mounting a support bracket to spaced tubes according to claim 15 wherein the step of engaging the spaced apart tubes with the pipe-receiving openings of the resilient clips includes simultaneously engaging a plurality of said spaced apart tubes with a plurality of said pipe-receiving openings of the resilient clips by moving said mounting bracket in said first direction.

17. The method for releasably mounting a support bracket to spaced tubes according to claim 15 wherein the step of moving the mounting bracket in said first direction includes providing said mounting bracket with said resilient clips, each having pipe-receiving openings facing said first direction.

* * * * *